March 31, 1953          H. VAN ZANDT          2,633,311
CONVERTIBLE FIXED-WING PADDLE WHEEL AIRCRAFT
Filed Aug. 7, 1950          2 SHEETS—SHEET 1
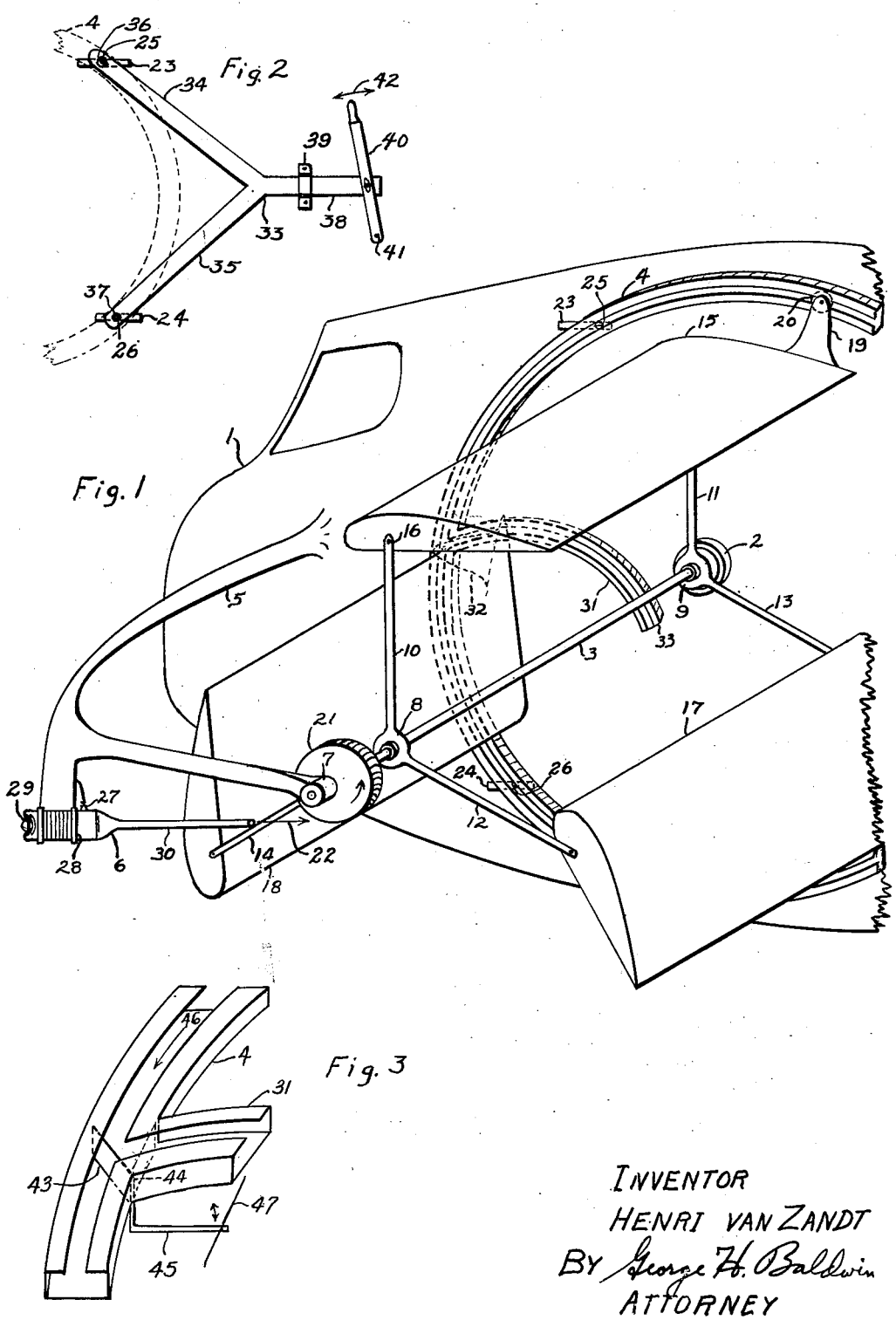
INVENTOR
HENRI VAN ZANDT
BY George H. Baldwin
ATTORNEY March 31, 1953      H. VAN ZANDT      2,633,311
CONVERTIBLE FIXED-WING PADDLE WHEEL AIRCRAFT Filed Aug. 7, 1950      2 SHEETS—SHEET 2

INVENTOR
HENRI VAN ZANDT
BY George H. Baldwin
ATTORNEY

Patented Mar. 31, 1953

2,633,311

UNITED STATES PATENT OFFICE 2,633,311

CONVERTIBLE FIXED-WING PADDLE WHEEL AIRCRAFT

Henri van Zandt, Starke, Fla.

Application August 7, 1950, Serial No. 178,111

12 Claims. (Cl. 244—9)

This application is a continuation-in-part of my application Serial No. 616,066, filed September 13, 1945, entitled Aeroplane Turbine Control Rotary Wing Jet Propulsion Turbine.

My invention relates to a heavier-than-air type of aircraft and more particularly to improvements in aircraft making use of airfoils which revolve about a shaft in the nature of a paddle wheel to provide lifting force or horizontal driving force, or both.

The invention particularly contemplates improved means for controlling the pitch of the airfoils during the revolution and to means for aligning the airfoils into parallel positions for operation of the aircraft as a conventional stationary wing aircraft.

A general object of the invention is to improve the pitch control of the airfoils of a revolving wing aircraft.

An additional object is to provide means to stabilize the revolving airfoils into a predetermined parallel alignment for conventional flight.

A further object of the invention is to provide a revolving wing aircraft particularly adapted for propulsion by a jet engine, in a manner such that the jet engine may be used for forward propulsion as well as for the provision of the power necessary to revolve the airfoils.

Figure 4:
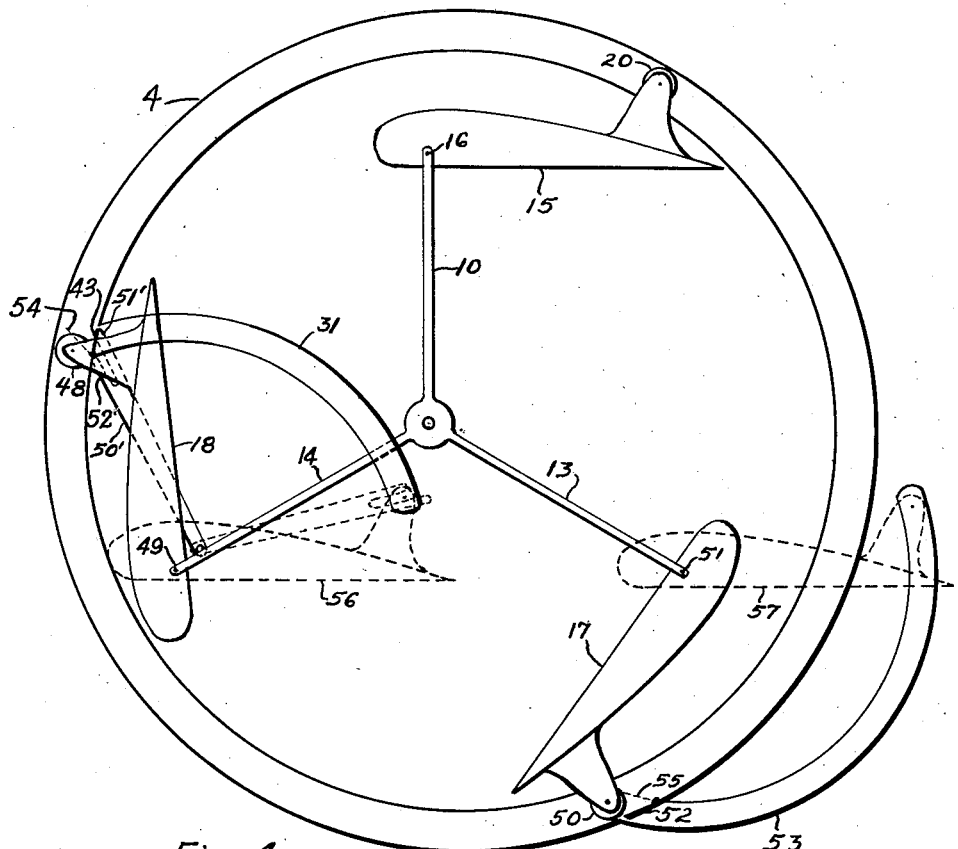
Figures 5, 6:
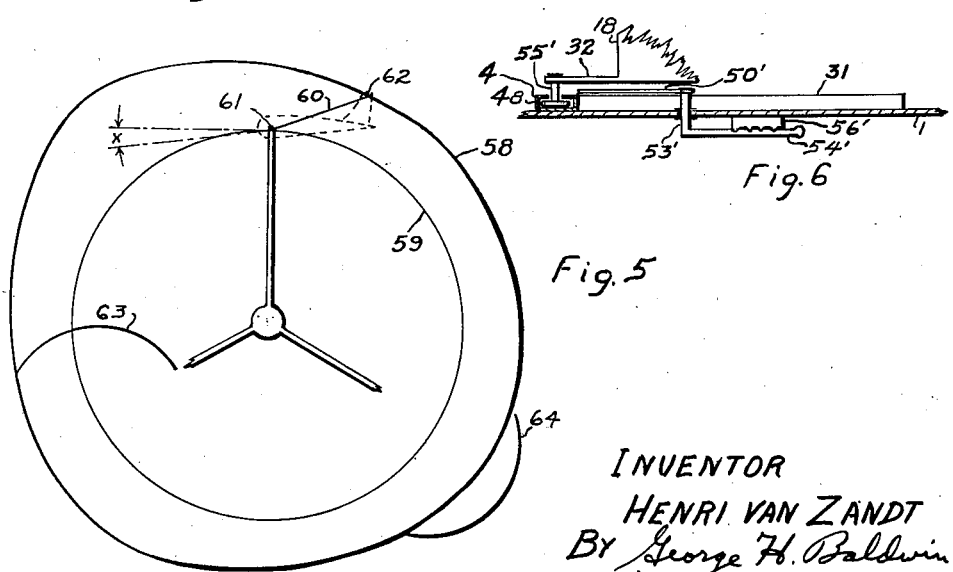

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which:

Fig. 1 is a general view of a portion of an aircraft utilizing revolving airfoils as it may appear in flight, Fig. 2 is a detailed view of a mechanism adapted to alter the flight characteristics of the aircraft of Fig. 1 by adjusting the pitch control mechanism, Fig. 3 is a detailed view of an arrangement useful in changing the aircraft from a condition for operation as a revolving wing aircraft to a condition for operation as a stationary wing aircraft, Fig. 4 is a diagrammatic presentation of airfoil positions which may be assumed during flight of the aircraft, Fig. 5 is a diagrammatic presentation of a modification respecting the shape of a guide ring whereby altered or improved operation may be obtained, and Fig. 6 is a detail view of a portion of the mechanism useful in controlling airfoil positions.

Referring now to Fig. 1, the aircraft may comprise a fuselage or body portion 1 to which is affixed a stationary bearing block 2 to support a rotatable shaft 3. The body portion 1 further supports a guide channel or ring 4, which is adjustable in position on the body, and a strut 5. The strut 5 extends outwardly from the body to support at its outward end a jet engine 6 and further to support a bearing boss 7 in which the outer end of shaft 3 is free to rotate. Mounted to shaft 3, and rotatable therewith, are two hubs 8 and 9 carrying spokes 10, 11, 12, 13 and 14. An airfoil 15 is mounted between spokes 10 and 11, spoke 10 being pivotally attached at 16 to the outboard end of the airfoil and spoke 11 being similarly attached to the inboard end of the airfoil. Airfoil 17 is attached in the same manner to spokes 12 and 13 and airfoil 18 is attached to spoke 14 and to a second spoke extending from hub 9, not shown in the drawing. Each airfoil is provided at its inboard end with an upstanding arm 19 to which is attached a freely rotatable wheel 20 for cooperation with the guide channel 4, the arm and wheel providing a guide follower.

The relative positions of the guide wheel 20, or guide follower, and of the axis established by the pivotal connections of the airfoil to the spokes establish the pitch of the airfoil.

Airfoils 15, 17 and 18 are revolved about the axis of shaft 3 by the rotation of the shaft. The shaft is driven by a bucket turbine wheel 21, attached to the shaft near its outboard end and cooperating with the exhaust of combustion products, indicated by the arrow 22, from the jet engine 6.

Guide 4 conveniently takes the form of a channel in which wheel 20 is confined. The channel guide member 4 may be circular as shown in the drawings, or it may be elliptical or egg-shaped. The guide is so mounted to the aircraft body 1 that it may be adjusted along the body in the fore and aft direction. Slots 23 and 24 are cut in the aircraft body to permit this adjustment. The guide is held against the body by flat headed bolts 25 and 26 which extend through the back of the channel, the heads being flush therewith not to interfere with the wheels 20, and into the body 1 through the slots 23 and 24. An adjusting arrangement within the body, later described in connection with Fig. 2, retains the inner ends of the bolts to hold the channel guide against the surface of the body.

In operation as a revolving airfoil aircraft, jet engine 6 is supplied with fuel preferably through strut 5 and with electrical ignition energy through the strut to a spark plug 27 arranged to explode the fuel in the combustion chamber portion 28 of the engine. The jet engine may take in air through a forward opening 29 to be mixed with fuel in the combustion chamber, to be exploded by spark plug 27, and to exhaust the combustion products through a jet tube 30. The jet engine is, preferably, of the type known as a "reso-jet" making use of vibrating reeds at the forward end of the combustion chamber which admit air during the interval between explosions and which operate in the manner of flap valves to form a solid forward wall for the chamber at the time of each explosion. A resultant forward thrust is applied through strut 5 to the aircraft and the exhaust products are expelled in the direction of arrow 22 against the lower portion of the bucket turbine wheel 21 to drive shaft 3 in a counter-clockwise direction as seen in Fig. 1. This rotation of shaft 3, in bearings 2 and 7, revolves the airfoils about the axis of shaft 3 to provide lifting force or forward thrust, or both. As the airfoils revolve, the wheel 20 in cooperation with guide 4 changes the pitch or angle of attack of the individual airfoils, since the axis of shaft 3 and the center of the circular guide are not coincident. With a circular guide, its center should be slightly aft of the axis of shaft 3 in normal operation. The amount of lift, and the amount of forward motion of the aircraft, provided by the revolving airfoils, is adjusted by changing the relative positions of the axis of shaft 3 and the center of the guide, the adjustments being made by moving bolts 25 and 26 along the slots 23 and 24, respectively.

The main guide 4 further comprises two secondary or branch channels, of which only channel 31 is visible in Fig. 1, so arranged in the present instance that two of the airfoils may be abruptly changed in pitch and aligned with the third airfoil to present the same angle of attack for flight in the manner of a conventional aircraft. The branch channel 31 is joined to, or is derived from, the main guide channel 4 at a predetermined part of the main channel. When airfoil 18 is in the position shown in Fig. 1, the wheel mounted to its arm 32 may be admitted into branch channel 31, and when the wheel attached to arm 32, after following the branch channel for its restricted length, seats against the closed end 33 of the branch channel, the airfoil 18 will be aligned with airfoil 15. A similar secondary branch or derived channel, not shown in Fig. 1, is provided for the wheel controlling the pitch of airfoil 17 to permit it to assume a parallel alignment, and to present a parallel angle of attack for conventional flight.

Fig. 2 discloses the mechanism disposed within the aircraft body through which adjustments to the position of guide 4 are accomplished. As shown in this figure, a yoke or Y-shaped strap member 33 is arranged to lie flat against the inner wall of the aircraft body 1. Bolts 25 and 26 extend through slots 23 and 24 and through the end portions of the legs 34 and 35, respectively, of the yoke member 33. Nuts 36 and 37 are located on the bolts to hold the yoke member to the guide channel member 4. Legs 34 and 35, lying flush against the inner side of the wall of body member 1, thus hold channel 4 tightly against the outer side of the wall of body 1. The portion 38 of the yoke member extending from legs 34 and 35 passes under a suitable bracket 39 and is attached near its end to a lever 40. This lever is pivoted at a point 41 to the body of the aircraft and may be moved in the directions of the arrow 42 to slide the yoke back and forth. This motion of the yoke slides bolts 25 and 26 in slots 23 and 24 and moves the channel fore and aft into a desired position. A suitable detent or locking mechanism can be arranged to hold the yoke in its selected position, but for the sake of clarity, such detent mechanism is not shown.

Fig. 3 shows a portion of the main guide channel 4 and a portion of the branch channel 31 together with a mechanism arranged to permit the guide follower wheel of an airfoil to travel into the branch channel when desired, and to prevent the wheel from entering the branch channel when revolving airfoil flight is desired. To accomplish this purpose there is provided a door, shutter or deflector 43 hinged inside the channel at the intersection by a hinge 44 and firmly attached to a rod 45. When the door 43 is in the position indicated by solid lines in Fig. 3, extending across the main guide channel, the wheel of an airfoil approaching in the direction of arrow 46 will be deflected into the branch channel 31, whereas the wheel will not be deflected when the door 43 is in the position indicated by dotted lines. The deflector may be moved from one to the other of these positions by rotating the shaft 45 and this rotation may be conveniently accomplished by means of a control cable 47. Since there are two branch channels provided in an aircraft according to the described embodiment of my invention, which utilizes three airfoils on each side of the aircraft body, the control cable 47 is preferably arranged to operate doors controlling the entrance of wheels into each of the branch channels simultaneously or substantially simultaneously.

The diagrammatic representation of Fig. 4 indicates the positions of airfoils 15, 17 and 18 in solid lines as they may be at one instant during revolving airfoil flight. The wheel 20 attached to airfoil 15, and the pivotal connection of this airfoil at point 16 to spoke 10, maintain the airfoil in the position shown, and the position of wheel 48 attached to airfoil 18, together with the position of pivot point 49 on spoke 14, determine the orientation or pitch angle of airfoil 18. Similarly, the relative positions of wheel 50 and pivot point 51 determine the pitch angle of airfoil 17. It will be noted that door 43, guarding the entrance to branch channel 31, and door 52, guarding the entrance to branch channel 53, are each in closed position. Had door 43 been in the position indicated by dotted line 54, and door 52 in the position indicated by dotted line 55 at the time that wheels 48 and 50 reached the entrances of channels 31 and 53, respectively, the wheels 48 and 50 would have been forced or shunted into the branch channels. If these wheels had entered the branch channels, the airfoils would have reached the positions 56 and 57, respectively, as indicated in dotted lines. With the airfoils in this position, it will be apparent that conventional flight could be accomplished since the airfoils are parallel.

It will be obvious that forward motion of the aircraft will tend to force the airfoils 17 and 18 into the aligned positions shown in dotted lines in Fig. 4, although a suitable locking arrangement may be desirable to hold the airfoils in the aligned or parallel positions. Such a locking arrangement may take the form of solenoid operated catches, actuated from within the aircraft body by suitable electrical connections, or, alternatively, mechanically operated catches or controls may extend through the wall of the aircraft body adjacent branch channels 31 and 53.

While forward motion of the aircraft will tend to force airfoils 17 and 18 into the aligned positions shown in dotted lines in Fig. 4, a locking and control mechanism is preferably provided, which may comprise an arm 50' having a forked end of which the longer finger 51' is pushed along guide 31 by the shaft of wheel 48 when the airfoil is forced back by the force of the air, with the door 43 open, whereby the arm 50' is moved from the solid line position to the dotted line position of Fig. 4, as the airfoil moves to position 56. Finger 52' prevents the airfoil from moving from its position 56 until the arm 50' is rotated back to the solid line position, and in being so rotated, the airfoil guide follower is again forced, by finger 51', into the main guide 4.

It will be noted that the axis of shaft 53' about which arm 50' pivots is slightly removed from the center of curvature of the arc represented by branch guide channel 31 whereby the shaft which mounts guide follower wheel 48 enters the slot between fingers 51' and 52' only after a short travel down the branch guide. The longer finger 51' is proportioned to prevent this shaft under any circumstances to pass beyond this finger.

This arrangement is further shown in Fig. 6, which is a side view of the mechanism for controlling the airfoil 18 in the guide 31. Most of the parts shown in Fig. 6 have been heretofore explained and are identified by the numerals used in connection with Figs. 1 through 4. Arm 50' is shown connected to a shaft 53' terminating in a hand-operated lever portion 54' to rotate the shaft. Rotating shaft 53', which is mounted in a suitable bearing through the wall of body 1, will sweep arm 50' along secondary guide 31. The arm 50' is swingable far enough in the one direction to force shaft 55', which carries guide wheel 48 and is a part of the guide follower for airfoil member 18, into the main guide channel 4 and, in the other direction, far enough to hold the wheel at the inner end of the branch channel for parallel airfoil flight. Suitable locking means for lever 54, such as are indicated at 56', are preferably provided. A similar arrangement may be provided for each branch channel of the aircraft.

It is thus possible to change from conventional to revolving blade flight, prior to landing, for example, or upon engine failure to operate the craft as an auto-revolving blade aircraft to provide a slow rate of descent.

With the airfoils aligned, making use of the branch channels, the jet engine shown in Fig. 1 may be used for forward propulsion of the aircraft and if desired, a slight adjustment of the position of the engine may be made to direct the stream of combustion products below or to one side of the turbine wheel, thereby to prevent burning of the lower part of the turbine wheel, which will be stationary, of course, during conventional flight.

An important aspect of my invention comprises the location of the guide member 4 outside of the normal positions of the airfoils, that is, the main guide is arranged entirely outside of the ends of spokes 10, 11, 12, 13 and 14. Being so located, the guide may be of light construction but will provide firm control of the airfoil orientation with a minimum of friction. It is further possible with this construction readily to provide any desired change of pitch of each airfoil as it rotates through its orbit. An almost infinite variety of shapes for the main guide, varying from circular to elliptical or egg shapes, may be provided to produce with a high degree of accuracy the exact angle of attack desired at each position throughout the revolution.

In revolving airfoil aircraft of the general type to which my invention herein appertains it has been possible to vary the airfoil pitch during each revolution as a simple function, such as a sine function, of the position of the airfoil about the axis of revolution. The large overall dimensions of the guide according to my invention, and the manner in which the guide operates to control the pitch, however, make it possible readily to select any pitch which may be desired at each position in the orbit of the airfoils.

It has been previously known that a sinusoidal variation in the pitch angle, that is, the angle presented between the tangent to the circle of revolution of the airfoils and the airfoil surface, in revolving wing aircraft, results in some loss in efficiency due to a departure from the angle of attack of the airfoil throughout substantial portions of a cycle from the aerodynamically correct angle. Since for relatively low forward speeds a sinusoidal variation approximates the most desirable conditions, a sinusoidal variation may be successfully employed in my invention and such variation will result from the use of a circular guide, as shown in Figs. 1 and 4. The adjustment of the guide to dispose its center in various positions with respect to the axis of revolution of the airfoils provides a method of adjusting the lift and forward thrust provided by the airfoils. To convert the craft for high speed operation, however, means comprising the secondary or branch channels are provided to convert the aircraft into a stationary wing triplane, or similar aircraft, for conventional flight.

It is a simple matter, moreover, further to improve the operation at relatively low speeds by utilizing, as shown in Fig. 5, a main guide which is cam shaped and not circular.

In Fig. 5, for example, a non-circular guide 58 is shown which may take the place of the circular guide heretofore described. This non-circular guide may provide a somewhat slower change in the pitch of the airfoil in travelling across the upper arc of its orbit and a more rapid change of pitch as it starts downward in the forward arc of its orbit. The most effective shape of guide may be calculated for a given set of circumstances to meet the particular requirements or may be found by experimentation. The desired pitch is then readily reproduced by constructing the guide with the proper separation from the circular path 59 defined by the pivot points mounting the airfoils to the arms extending from the central shaft, and the desired rate of change of pitch during each part of the revolution is automatically obtained. The guide is, of course, preferably formed without corners which might cause excessive vibration but is rather smoothly curved.

The exact mathematical computation of the proper pitch of the airfoils at each position in the cycle of revolution may be made in accord with the discussion in United States Patent No. 2,123,916, issued July 19, 1938, to Adolph Rohrback and entitled "Aircraft." Once the desired pitch angle has been determined for a number of specific selected points in the revolution, the guide is designed to provide these pitch angles.

Fig. 5 discloses a guide so designed. If it is desired that the airfoils have a pitch angle of $x$ degrees, for example, as they reach the position in the orbit indicated in Fig. 5, a line 60, representing the distance and direction between the pivot point 61 and the center 62 of the follower wheel, is drawn in the required direction to establish the position of the point 62 necessary to provide the desired or correct pitch angle $x$ of the airfoil. This is repeated at a number of positions to locate a number of point positions for the center 62 throughout the orbit. A guide may then be constructed of the shape necessary to position the center of the follower wheel at the points 62 so established throughout the orbit.

Branch channels 63 and 64 for the purpose of converting the aircraft to conventional flight conditions are preferably provided in the channel regardless of the shape of the channel as heretofore described and as indicated schematically in Fig. 5.

It will be understood that the complete aircraft will comprise a second group of airfoils for the starboard side of the fuselage which is similar to the port side group shown in the figures, and a second jet engine on the starboard side of the fuselage is also provided. It is preferred that the shaft 3 should extend through the fuselage to form the axis of both sets of airfoils and to be driven by the turbine wheels on both sides of the fuselage. It will be further understood that the fuselage 1 of Fig. 1 carries stabilizers, elevators and a fin and rudder near the tail, not shown, each of which may be of conventional construction and which are useful for the usual purpose during flight of the aircraft, with the airfoils arranged either for conventional flight or for revolving airfoil flight.

While the invention is specifically described as applied to an aircraft comprising two sets or groups of three airfoils each, one such set being disposed on each side, two airfoils only may make up each set or a greater number may be employed, and any even number of sets may be used. One jet engine, centrally located, may prove sufficient, although a number greater than two, as described, may be desirable.

While I have shown only certain preferred embodiments of my invention by way of illustration, many modifications will occur to those skilled in the art, and I therefore wish to have it understood that I intend, in the appended claims, to cover all such modifications as fall within the true spirit and scope of my invention.

What I claim as new and desire to secure by United States Letters Patent is

1. In an aircraft comprising a plurality of airfoil members arranged for bodily revolution about a normally horizontal axis of revolution parallel to said airfoils and perpendicular to the direction of flight and having means to maintain a predetermined portion of each said airfoil member at a predetermined distance from said axis; the combination of a guide extending continuously around said axis, a guide follower member attached to each said airfoil member cooperating with said guide at points respectively remote from said predetermined portions, a secondary guide branching from said first guide and positioned and arranged to dispose one said airfoil member parallel to another said member when the follower member of said one member has traversed said secondary guide, and a deflector selectively operable to shunt one said follower member into said secondary guide.

2. An aircraft according to claim 1 wherein said guide is located entirely outside the circular path of said predetermined portions.

3. An aircraft according to claim 1 including means to adjust the position of said guide in respect to said axis.

4. In an aircraft having a fuselage and a plurality of aerodynamically profiled, pivotally supported airfoils revolving bodily in a substantially circular path about a normally horizontal axis of revolution parallel to said airfoils transverse to the direction of flight, the combination of a continuous main guide channel, a guide channel follower attached to each airfoil cooperating with said main guide channel to vary the pitch of said airfoils during each revolution, means for adjusting the position of said guide channel relative to said axis to alter the variations of pitch of said airfoils, a secondary guide channel branching from said main channel at a position, and of a direction, shape and extent, such that an airfoil whose follower follows said secondary channel will be positioned parallel to another said airfoil, and a deflector adjustable in position selectively to block said main channel and deflect one of said followers into said secondary channel as it reaches said position at which said secondary channel branches from said main channel or to block said branch channel whereby said followers continue to follow said main channel.

5. In an aircraft comprising a fuselage and a plurality of airfoil members, a normally horizontal shaft extending transverse to the direction of flight laterally from a side of said fuselage, a bearing on said fuselage mounting said shaft, a turbine rotor mounted on said shaft, a jet propulsion device mounted on said fuselage in position to direct combustion products thereof aftwardly against a portion of said rotor to drive said rotor and rotate said shaft in said bearing, members attached to said shaft for rotation therewith extending radially outwardly therefrom and pivotally supporting said airfoil members at a predetermined distance from said shaft, a continuous guide member adjustably mounted to said fuselage surrounding said shaft and having a minimum radial spacing from said shaft greater than said distance, a guide following member rigidly connected to each said airfoil member cooperating with said guide member at a point remote from the pivotal mounting point of the respective airfoil member thereby to control the angle of attack thereof, said points for each said airfoil member being spaced by a predetermined fixed distance, a restricted length branch guide extending in a predetermined direction from a predetermined point of said guide member and shaped in the form of an arc, the radius of curvature of said arc being equal to said fixed distance, and a deflecting member selectively operable into position to permit said guide following members uninterruptedly to traverse said guide member or to force one said guide following member as it reaches said predetermined point of said guide member into said branch guide thereby abruptly to change the angle of attack of the airfoil member attached to said one guide following member.

6. In an aircraft comprising a plurality of airfoil members revolvable bodily about a normally horizontal axis parallel to said airfoil members and perpendicular to the direction of flight and means to maintain a predetermined portion of each said member at a fixed distance from said axis, a guide follower attached to each said airfoil member, a non-circular continuous guide member surrounding said axis and followed by a point of said follower remote from said portion of the respective airfoil member thereby to control the pitch of said airfoil members throughout the orbit of revolution thereof, said guide being shaped to provide effectiveness for each position of each said airfoil member for a predetermined selected flight condition, a secondary guide branching from said first guide member along which said point of said follower of one said airfoil member may follow, said secondary guide being proportioned and arranged to dispose said one airfoil member parallel to another said airfoil member for conventional flight in response to said following by said point of said secondary guide for a predetermined distance along said secondary guide, and means operable selectively to shunt one said follower point along said branch or to guide said follower points along said first guide member.

7. An aircraft according to claim 6 wherein said first guide member is proportioned to lie everywhere outside of said fixed distance from said axis.

8. An aircraft according to claim 6 wherein said first guide member is adjustable in position with respect to said axis in a direction perpendicular thereto.

9. In an aircraft comprising a plurality of airfoil members arranged for bodily revolution about a normally horizontal axis parallel to said airfoil members and perpendicular to the direction of flight and having means to maintain a predetermined portion of each member at a predetermined distance from said axis, the combination of a main guide extending continuously around said axis, a guide follower member attached to each said airfoil member cooperating with said main guide at points respectively remote from said predetermined portions, a secondary guide branching from said main guide and positioned and arranged to dispose one said airfoil member parallel to another said member when the follower member of said one member has traversed said secondary guide, and a member contacting a portion of said guide follower member when said last member is in said secondary guide movable to force said last member toward said main guide.

10. An aircraft according to claim 4 including a member operable at said secondary guide channel to engage said follower and to move said follower from said guide channel into said main channel.

11. In an aircraft comprising a fuselage and a plurality of airfoil members, a normally horizontal shaft extending transverse to the direction of flight laterally from a side of said fuselage, a bearing on said fuselage mounting said shaft, a turbine rotor connected to said shaft, a jet propulsion device carried by said fuselage and arranged to drive said rotor to rotate said shaft in said bearing and to propel said aircraft forwardly in response to the expulsion of exhaust gases therefrom, members attached to said shaft for rotation therewith extending radially outwardly therefrom and pivotally supporting said airfoil members at a predetermined distance from said shaft, a continuous guide member mounted to said fuselage surrounding said shaft and having a minimum radial spacing from said shaft greater than said distance, a guide following member rigidly connected to each said airfoil member cooperating with said guide member at a point remote from the pivotal mounting point of the respective airfoil member thereby to control the angle of attack thereof, said points for each said airfoil member being spaced by a predetermined fixed distance, a restricted length branch guide extending in a predetermined direction from a predetermined point of said guide member and shaped in the form of an arc, the radius of curvature of said arc being equal to said fixed distance, and a deflecting member selectively operable into position to permit said guide following members uninterruptedly to traverse said guide member or to force one said guide following member as it reaches said predetermined point of said guide member into said branch guide thereby abruptly to change the angle of attack of the airfoil member attached to said one guide following member.

12. An aircraft according to claim 1 comprising a jet propulsion unit, a turbine rotor operative at said axis normally to revolve said airfoil members bodily about said axis, said jet unit being mounted in front of said rotor and oriented to direct exhaust gases in an aftwardly direction at said rotor to cause rotation thereof, whereby forward thrust to said aircraft is provided by said jet unit during flight as a revolving airfoil aircraft, and as a stationary wing aircraft when said airfoil members are aligned.

HENRI van ZANDT.

REFERENCES CITED

The following references are of record in the file of this patent:

UNITED STATES PATENTS

| Number | Name | Date |
|---|---|---|
| 379,362 | Bryant | Mar. 13, 1888 |
| 971,379 | Hillis | Sept. 27, 1910 |
| 1,773,010 | Rixe | Aug. 12, 1930 |
| 1,845,184 | Prinz | Feb. 16, 1932 |
| 2,507,657 | Wiessler | May 16, 1950 |

FOREIGN PATENTS

| Number | Country | Date |
|---|---|---|
| 8,542 | Great Britain | 1840 |
| 15,890 | Great Britain | 1907 |